Patented May 13, 1941

2,241,829

UNITED STATES PATENT OFFICE 2,241,829

PROCESS FOR THE MANUFACTURE OF ARYL MERCURY COMPOUNDS

Georges Joseph Six, Leytonstone, London, and Joseph Roy Booer, Addiscombe, England, assignors, by mesne assignments, to F. W. Berk & Company, Inc., New York, N. Y., a corporation of Maryland No Drawing. Application January 19, 1939, Serial No. 251,704. In Great Britain March 7, 1938

8 Claims. (Cl. 260—433)

The present invention relates to seed disinfectants, and one of its objects is the manufacture of compounds for such disinfectants in an economical and simple manner.

A further object hereof is the production of seed disinfectants having a high disinfectant value, which can be used without risk of damage to the germinative properties of the seeds treated.

It is already known that effective seed disinfectants can be prepared from such compounds as phenyl mercury acetate, for instance by incorporating the same with an inert filler and applying to seeds in the dust form. Phenyl mercury acetate has been prepared by the interaction of mercuric acetate, benzene and acetic acid at elevated temperatures, but this reaction resulted in the formation of a large proportion, often as much as 80%, of polymercurated benzene derivatives in the form of their acetates, and the latter compounds, owing to their very sparing solubilities in water and other solvents, were both unsatisfactory as seed disinfectants and very difficult to convert into effective mercuric disinfectants.

It has also been proposed to prepare seed disinfectants by combining phenyl mercury hydroxide or the like with nitrogen compounds such as urea, acetamide and the like. These disinfectants are applied to seeds after being suitably diluted with a liquid or solid diluent. The nitrogen compounds are of the type Z—HN—R', in which Z is a monovalent replaceable element and R' an organic radical, one carbon atom of which is directly attached to the nitrogen of the formula. The reaction of phenyl mercury acetate with the above-mentioned nitrogen compounds is, however, a cumbersome and costly operation by the methods hitherto known.

In accordance with the present invention, a compound of the type $R(HgX)_n$ is used as starting material. In such compounds, R is an aryl radical, X is an acid radical, either organic or inorganic, and $n$ is a small whole number, usually from one to three. Said compound is mixed in the presence of water with an alkaline oxide or the like having a hydrogen ion concentration in water approximating that of magnesium oxide. Preferably, the hydrogen ion concentration is maintained substantially constant to facilitate the reaction and this may be obtained by an excess of said oxide or by continual additions thereof as the reaction proceeds. The reaction takes place smoothly without the necessity for heating or for the addition of catalysts with the formation of the corresponding mercury hydroxide.

Such hydroxides may be employed as such in seed disinfectants but, in accordance with the present invention, they may be treated with compounds of the type Z—NH—R', usually in water solution and at elevated temperatures whereby the OH group of the mercury compound is replaced by the radical —NH—R', the products being generally water soluble.

More specifically, the present invention provides a process for the manufacture of seed disinfectants, comprising treating phenyl mercury acetate, for example, or the corresponding di- or tri-mercurated compounds, or a mixture of two or more of these substances, with magnesium oxide in the presence of water to produce the corresponding organic hydroxide or hydroxides. According to a modified process, the phenyl compounds may be replaced by the corresponding derivative or derivatives of a homologue of benzene. If desired, an inert diluent may be added, either to the reaction product or in the course of the process; the diluent may be solid or liquid, and conveniently comprises an excess of magnesium oxide.

The mercury hydroxides produced in accordance with this invention can be employed with satisfactory results as seed disinfectants. According to a feature of this invention, however, they are preferably reacted with nitrogen compounds of the type Z—NH—R', referred to above, the resulting mercury-containing nitrogen compounds being particularly good seed disinfectants.

The form of magnesium oxide preferably used is that known commercially as "caustic burnt magnesite," which is produced from the mineral magnesite by calcining it at a relatively low temperature.

The organic mercury hydroxides produced in accordance with this invention possess a greater degree of solubility than hitherto recognised by scientific literature, and the corresponding mercury-containing nitrogen compounds also possess a higher degree of solubility than that previously recognised.

A further advantage of the invention is that magnesium oxide is only a mild alkali, and does not cause polymerization or resinification, to which urea and other nitrogen compounds of the type referred to are susceptible. It is, therefore, possible to carry out the production of the mercury-containing nitrogen compounds in one operation by mixing the chosen acetate, either in the pure state or containing the polymercurated compounds already mentioned, with the specified magnesium oxide in the presence of some water, and with the chosen nitrogen compounds of the type Z—NH—R'. As a result of this single reaction, there are produced an organic mercury-containing nitrogen compound, and magnesium acetate.

The combined process may also be carried out in the presence of an inert diluent, the proportion of the mercury compound being suitably adjusted so that, in a single operation, an effective dust disinfectant for seeds can be simply and economically produced. In this operation, the magnesium acetate or other salt produced as a by-product is advantageous in that, being slightly hydroscopic, it tends to allay the dust.

The following are specific examples of the production of seed disinfectants in accordance with the present invention:

Example I 336 grams of pure phenyl mercury acetate, 90 grams of caustic burnt magnesite and 70 grams of urea are boiled in 2 litres of water for five minutes. The mixture is filtered hot and then allowed to cool, as the result of which a copious crop of crystals separates. On washing the crystals in cold water, and drying, a product is obtained which has a melting point of 152° C. If the product is mixed with phenyl mercury urea prepared by known methods a melting point of 152° C. is again obtained, whereas if the product is mixed with phenyl mercury acetate a melting point of 122° C. is obtained, thus clearly distinguishing the prepared product from phenyl mercury acetate, the melting point of which is 149° C.

Example II

Following the procedure of the above example, and substituting an equivalent quantity of acetamide for the urea, phenyl mercury acetamide is produced, which melts at 161° C. and has a solubility of 24 grams per litre.

Phenyl mercury acetate may be replaced by phenyl di-mercury di-acetate, which is almost completely insoluble in water, with the result that a mercury-containing nitrogen compound is produced which is readily soluble in water.

If phenyl mercury acetate is replaced by tolyl mercury acetate, the corresponding tolyl compounds are formed. These may be found to have no fixed melting point owing to the presence of free isomeric compounds.

Example III

An example of the commercial preparation of a seed disinfectant according to the invention is as follows:

1.7 lbs. of commercial phenyl mercury acetate (containing about 50% phenyl mercury acetate and 50% polymercurated compound) are mixed with 10.2 lbs. of caustic burnt magnesite, 1.7 lbs. urea and 86.4 lbs. of a suitable inert filler. Sufficient water is added to form a paste and the whole is then dried and ground. On being exposed to the atmosphere for a sufficient time to allow water to be re-absorbed to an extent which will prevent undue dustiness, the material can be used as a seed disinfectant and has been found to be entirely effective for the control of *Helminthosporium avenae* and *Tilletia tritici* when applied at the rate of 2 ounces of dust per bushel of seed.

Seed disinfectants prepared in accordance with this invention have been found in practice to be substantially more effective in sterilizing infected seeds than phenyl mercury acetate.

While in the above specific examples a number of variations have been described, the invention is, of course, not limited thereto. As compounds of the type Z—NH—R' there may be used in addition to those named above, thio- and other substituted ureas, cyanamide, aryl and alkyl amines, aryl and alkyl mono- and di-substituted guanidines, and the like. The named organic mercury compounds may be replaced by others wherein other acid radicals appear, such as sulphate, chloride, formate, butyrate and many others. The phenyl or like group may have substituents on the carbon containing ring as is well known. Furthermore, it is not necessary to follow the exact procedure outlined above, as variations in the details thereof will be apparent to those skilled in the art. In view thereof, the present invention is to be broadly construed and not to be limited except by the character of the claims appended hereto.

What we claim is:

1. Process for the manufacture of seed disinfectants which comprises treating a compound of the type $R(HgX)_n$ in which R is an aryl radical, X is an acid radical which forms a soluble magnesium salt and $n$ is a small whole number, in the presence of water with magnesium oxide, whereby a reaction takes place with the formation of the corresponding mercury hydroxide.

2. Process for the manufacture of seed disinfectants which comprises treating a compound of the type $R(HgX)_n$ in which R is an aryl radical, X is an acid radical which forms a soluble magnesium salt and $n$ is a small whole number, in the presence of water and magnesium oxide with urea, whereby a reaction takes place with the formation of a compound wherein mercury is directly linked to nitrogen.

3. Process for the manufacture of seed disinfectants which comprises treating a compound of the type $R(HgX)_n$ in which R is an aryl radical, X is an acid radical which forms a soluble magnesium salt and $n$ is a small whole number, in the presence of water and magnesium oxide with acetamide, whereby a reaction takes place with the formation of a compound wherein mercury is directly linked to nitrogen.

4. Process for the manufacture of seed disinfectants which comprises treating a compound of the type $R(HgX)_n$ in which R is an aryl radical, X is an acid radical which forms a soluble magnesium salt and $n$ is a small whole number, in the presence of water with magnesium oxide, adding thereto a compound of the type $NH_2$—R' in which R' is an organic radical taken from the class consisting of lower alkacyl, cyanogen, $NH_2CO$ and $NH_2CS$, a carbon atom of which is directly attached to the nitrogen, whereby a reaction takes place with the formation of a compound of the general type R—Hg—NH—R'.

5. Process for the manufacture of seed disinfectants which comprises treating a compound of the type $R(HgOH)_n$ in which R is an aryl radical and $n$ is a small whole number, in the presence of water with magnesium oxide, adding thereto a compound of the type $NH_2$—R' in which R' is an organic radical taken from the class consisting of lower alkacyl, cyanogen, $NH_2CO$ and $NH_2CS$, a carbon atom of which is directly attached to the nitrogen, whereby a reaction takes place with the formation of a compound of the general type R—Hg—NH—R' mixed with a magnesium salt.

6. Process for the manufacture of seed disinfectants which comprises treating a compound of the type R(HgCH₃COO)ₙ in which R is an aryl radical and $n$ is a small whole number, in the presence of water with magnesium oxide, adding thereto a compound of the type NH₂—R' in which R' is an organic radical taken from the class consisting of lower alkacyl, cyanogen, NH₂CO and NH₂CS, a carbon atom of which is directly attached to the nitrogen, whereby a reaction takes place with the formation of a compound of the general type R—Hg—NH—R' mixed with magnesium acetate.

7. Process for the manufacture of seed disinfectants which comprises treating a mixture of at least two compounds of the type R(HgX)ₙ in which R is an aryl radical, X is an acid radical which forms a soluble magnesium salt and $n$ is a small whole number, in the presence of water with magnesium oxide, adding thereto a compound of the type NH₂—R' in which R' is an organic radical taken from the class consisting of lower alkacyl, cyanogen, NH₂CO and NH₂CS, a carbon atom of which is directly attached to the nitrogen, whereby a reaction takes place with the formation of a compound of the general type R—Hg—NH—R'.

8. Process for the manufacture of seed disinfectants which comprises treating a compound of the type R(HgX)ₙ in which R is an aryl radical, X is an acid radical which forms a soluble magnesium salt and $n$ is a small whole number, in the presence of water and magnesium oxide with thiourea, whereby a reaction takes place with the formation of a compound wherein mercury is directly linked to nitrogen.

GEORGES JOSEPH SIX.
JOSEPH ROY BOOER.